United States Patent
Cordeiro et al.

(10) Patent No.: US 9,307,522 B2
(45) Date of Patent: Apr. 5, 2016

(54) TWO-LEVEL OPTIMIZATION FOR CLOUD SPECTRUM SERVICES

(75) Inventors: Carlos Cordeiro, Portland, OR (US); Srikathyayani Srikanteswara, Portland, OR (US); Reza Arefi, Great Falls, VA (US); Geoff Weaver, Portland, OR (US); Bahareh Sadeghi, Portland, OR (US); David M. Horne, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 91 days.

(21) Appl. No.: 13/995,850

(22) PCT Filed: Apr. 30, 2012

(86) PCT No.: PCT/US2012/035780
§ 371 (c)(1),
(2), (4) Date: Apr. 11, 2014

(87) PCT Pub. No.: WO2013/154576
PCT Pub. Date: Oct. 17, 2013

(65) Prior Publication Data
US 2014/0220993 A1    Aug. 7, 2014

Related U.S. Application Data

(60) Provisional application No. 61/603,261, filed on Apr. 11, 2012.

(51) Int. Cl.
*H04W 72/04*    (2009.01)
*H04W 74/00*    (2009.01)
(Continued)

(52) U.S. Cl.
CPC ........... *H04W 72/04* (2013.01); *H04L 41/0896* (2013.01); *H04W 4/24* (2013.01);
(Continued)

(58) Field of Classification Search
CPC ..... H04W 16/14; H04W 76/02; H04W 16/10; H04W 72/1257; H04W 72/0493; H04W 24/08; H04W 4/24; H04W 72/0486; H04W 28/16; H04W 72/04; H04W 88/06; H04L 41/0896
See application file for complete search history.

(56) References Cited

U.S. PATENT DOCUMENTS

| 5,608,727 A | 3/1997 | Perreault et al. |
|---|---|---|
| 7,269,151 B2 | 9/2007 | Diener et al. |

(Continued)

FOREIGN PATENT DOCUMENTS

| JP | 2011146755 A | 7/2011 |
|---|---|---|
| WO | 00/56099 A1 | 9/2000 |

(Continued)

OTHER PUBLICATIONS

International Search Report and Written Opinion received for PCT Application No. PCT/US2012/035748, mailed on Feb. 13, 2013, 9 pages.

(Continued)

*Primary Examiner* — Brandon Miller
(74) *Attorney, Agent, or Firm* — Ellis B. Ramirez; Prass LLP (57) ABSTRACT

A system and method are provided for implementing a cloud based spectrum management scheme that enables Dynamic Spectrum Access (DSA) through rentals of available spectrum in a two-level analytics process for optimization. Primary spectrum holders as exclusive licensees of underused spectrum communicate with a global spectrum broker to place portions of their underused spectrum into an auction-based rental market on the condition that they can regain control of their spectrum when a need arises. Local spectrum brokers communicate with the global spectrum broker to bid for available spectrum to meet their temporary needs in time and place. The local spectrum brokers, in turn, administer local optimization schemes over their portion of the global region to ensure that an expected level of quality of service is provided to individual customers with whom the local spectrum brokers communicate. The disclosed brokering scheme, properly administered, provides an incremental step-wise approach to solving long-term spectrum shortage for wireless communications.

20 Claims, 5 Drawing Sheets

(51) Int. Cl.
| | |
|---|---|
| *H04W 76/02* | (2009.01) |
| *H04W 72/12* | (2009.01) |
| *H04W 16/10* | (2009.01) |
| *H04W 4/24* | (2009.01) |
| *H04W 28/16* | (2009.01) |
| *H04W 24/08* | (2009.01) |
| *H04W 88/06* | (2009.01) |
| *H04W 16/14* | (2009.01) |
| *H04L 12/24* | (2006.01) |

(52) U.S. Cl.
CPC .............. *H04W 16/10* (2013.01); *H04W 16/14* (2013.01); *H04W 24/08* (2013.01); *H04W 28/16* (2013.01); *H04W 72/0486* (2013.01); *H04W 72/0493* (2013.01); *H04W 72/1257* (2013.01); *H04W 74/002* (2013.01); *H04W 76/02* (2013.01); *H04W 88/06* (2013.01)

(56) References Cited

U.S. PATENT DOCUMENTS

| | | | |
|---|---|---|---|
| 8,000,715 | B2 | 8/2011 | Melpignano et al. |
| 8,073,458 | B2 | 12/2011 | Chang |
| 8,938,271 | B2 * | 1/2015 | Srikanteswara et al. ...... 455/509 |
| 8,958,813 | B2 * | 2/2015 | Srikanteswara et al. ...... 455/454 |
| 8,972,311 | B2 * | 3/2015 | Srikanteswara et al. ........ 706/12 |
| 2006/0083205 | A1 | 4/2006 | Buddhikot et al. |
| 2006/0143111 | A1 * | 6/2006 | Mylet ............................ 705/37 |
| 2007/0149187 | A1 | 6/2007 | Levy |
| 2008/0108365 | A1 | 5/2008 | Buddhikot et al. |
| 2008/0117869 | A1 | 5/2008 | Freen et al. |
| 2008/0222019 | A1 * | 9/2008 | Stanforth et al. ............... 705/37 |
| 2008/0222021 | A1 | 9/2008 | Stanforth et al. |
| 2009/0022405 | A1 | 1/2009 | Griffin |
| 2010/0135226 | A1 | 6/2010 | Chandramouli et al. |
| 2010/0145745 | A1 | 6/2010 | Stanforth et al. |
| 2010/0238868 | A1 | 9/2010 | Melpignano et al. |
| 2010/0279680 | A1 | 11/2010 | Reudink |
| 2010/0325551 | A1 | 12/2010 | Lauwers et al. |
| 2011/0077042 | A1 | 3/2011 | Stanforth et al. |
| 2011/0205984 | A1 | 8/2011 | Lee et al. |
| 2012/0014332 | A1 | 1/2012 | Smith et al. |
| 2013/0005374 | A1 * | 1/2013 | Uusitalo et al. ............... 455/509 |

FOREIGN PATENT DOCUMENTS

| | | |
|---|---|---|
| WO | 2007/031958 A2 | 3/2007 |
| WO | 2013/126087 A1 | 8/2013 |
| WO | 2013/154596 A1 | 10/2013 |

OTHER PUBLICATIONS

International Search Report and Written Opinion received for PCT Patent Application No. PCT/US2012/035760, mailed on Jan. 24, 2013, 9 pages.

International Search Report and Written Opinion received for PCT Patent Application No. PCT/US2012/035780, mailed on Feb. 25, 2013, 10 pages.

International Search Report and Written Opinion received for PCT Application No. PCT/US2012/041167, mailed on Jan. 2, 2013, 12 pages.

International Search Report and Written Opinion received for PCT Patent Application No. PCT/US2012/041168, mailed on Feb. 1, 2013, 9 pages.

International Search Report and Written Opinion received for PCT Patent Application No. PCT/US2012/041169, mailed on Feb. 27, 2013, 9 pages.

International Preliminary Report on Patentability and Written Opinion for corresponding International Application No. PCT/US2012/035780, mailed on Oct. 23, 2014 (6 pages).

* cited by examiner

TWO-LEVEL OPTIMIZATION FOR CLOUD SPECTRUM SERVICES

CROSS-REFERENCE TO RELATED APPLICATIONS

The present application is a National Phase Application of PCT International Application No. PCT/US2012/035780, International Filing Date Apr. 30, 2012, which further claims priority from and the benefit of U.S. Provisional Patent Application Ser. No. 61/603,261 filed on Apr. 11, 2012, the entire disclosure disclosures of all of which is are incorporated herein by reference.

This application claims priority to U.S. Provisional Patent Application No. 61/603,261, entitled "Intelligent Spectrum Allocation Based on User Behavior Patterns For Efficient Spectrum Usage," filed on Feb. 25, 2012. This application is related to co-pending International Patent Application Nos. (PCT/US12/35760 filed on Apr. 30, 2012, and PCT/US12/35748 filed on Apr. 30, 2012), filed on the same day as this application, the disclosures of which are hereby incorporated by reference herein in their entirety.

BACKGROUND

1. Field of the Disclosed Embodiments

This disclosure relates to systems and methods for implementing two-level analytics to achieve large scale, scalable and efficient spectrum management for networks using spectrum allocated through a Dynamic Spectrum Access (DSA) scheme that allows spectrum holders, or a proxy assigned to manage a given allocation of spectrum, to temporarily "rent" access to the spectrum they hold to other entities.

2. Related Art

The last decade and a half has witnessed an explosion in growth in the use of, and requirements for, wireless data communications, particularly by individual users operating, for example, through licensed mobile cellular network operators. This growth continues unabated today as the numbers and types of wireless devices employed by the individual users to access all manner of wireless networks via various communication paths continue to multiply, increasing demand for available spectrum. As the increase in demand for wireless data access continues, the world is headed toward a global spectrum shortage. There is a finite amount of spectrum that can be tapped to support wireless data communication. Availability of wireless spectrum for the increasing numbers and types of mobile devices is key to the continued use of the spectrum to exchange data and for economic growth.

An availability of ever increasingly-capable wireless data communications has also created in individual customers an expectation of a certain quality of service. In short, individual wireless data communication consumers expect quality wireless data communications to be available anytime and anyplace. If solutions are not found, users of wireless devices will frustratingly experience increased instances of dropped calls and slow data speeds all while paying higher fees for access to the scarce resource that will be the wireless data and voice communication spectrum.

Currently, wireless devices are used to provide individuals virtually instantaneous and continuous wireless access to email, social media, applications and streaming video. These wireless devices are estimated to use 25 to 125 times the amount of spectrum that was used by earlier generation cellular telephones. Various industry estimates expect growth in global mobile data traffic to double every 1-2 years for the foreseeable future.

Exclusive mobile spectrum licenses carve out to their licensees portions of the available spectrum that are used for wireless data and voice communication. Licensees in any geographic area include government agencies, which sometimes reserve communication spectrum to certain "required" wireless voice and data communications. A non-exhaustive list of these communications users includes broadcast radio and television communications, satellite communications, public safety and emergency services communications, military communications, and certain other commercial communication requirements to include, for example, communications with aircraft for navigation and air traffic control. Licensees in particular geographic areas also include mobile cellular network operators. A cursory review of the breakdown of the licensed spectrum for any particular geographic area reveals that the availability of new spectrum to support the assignment of additional exclusive licenses to any particular licensee is nearly exhausted.

A detailed review of the challenges faced by mobile cellular network operators starts with an overview of their operations. Mobile cellular network operators license spectrum bands for their exclusive use within a particular geographic region. These entities then contract with individual customers to provide certain levels of service with express or implied guarantees of connectivity, and of communications fidelity at increasing rates of delivery. As mobile cellular network communication traffic continues its dramatic increase, congestion occurs today and the congestion problem is forecast to rise significantly in coming years in the portions of the spectrum currently licensed to mobile cellular network operators to support wireless voice and data communications.

In the face of current and forecast issues regarding network congestion in their licensed spectrums, mobile cellular network operators have taken to purchasing additional exclusive spectrum licenses in the secondary market from other exclusive licensees (spectrum holders) whose licensed spectrum is underused or otherwise available. Buying additional spectrum licenses allows mobile cellular network operators to build or expand their networks and handle more customer traffic. In fact, in late 2011, one major mobile cellular network operator in the United States reached an agreement, subject to regulatory approval, to buy a license for a small swath of wireless communication spectrum (around 20 MHz) from several broadcast cable companies for an amount that was reported to be in excess of three and one half billion dollars.

Efforts are ongoing to optimize wireless data communication to make more effective use of available spectrum. Consider the available spectrum as a pipe with a finite maximum diameter. Ongoing efforts attempt to optimize the flow of data through that pipe, thereby reducing the amount of spectrum used. These efforts include use of compression techniques, video optimization and burst transmissions such that overall data transmission through the pipe is streamlined and optimized, i.e., techniques are implemented to pass larger amounts of data in what appears to be a smaller volume of flow through the pipe. Additional efforts are focused on concepts such as Wi-Fi offload or small cell development to ease the burden on the saturated portions of the spectrum exclusively licensed to mobile cellular network operators. All efforts at making data flow more efficient, thereby improving spectral efficiency, will reap benefits. Regardless of these efforts, however, the pipe will never get any bigger due to the fixed, finite spectrum covered by licenses. The above efforts may delay the inevitable. There will still come a time, however, when the currently-licensed portions of the spectrum that support commercial mobile voice and data communications will become overburdened. When this overburdening occurs, a mobile cellular network operator has at its disposal methods, some of which are used today, by which to maintain service across its exclusively-licensed spectrum for all of its individual customers. Often these methods reduce the quality of service experienced by individual customers. Common techniques include, for example, mobile cellular network operators "throttling" rates at which data may be received by individual customers. Of course, as with any supply and demand scheme, a mobile cellular network operator can exact a premium from some percentage of its individual customers according to currently-licensed spectrum for its use to prioritize which of the individual customers get "throttled" last.

SUMMARY OF DISCLOSED EMBODIMENTS

A review of utilization of certain of the above-discussed licensed spectrums, other than those licensed to mobile cellular network operators, reveals that, although allocated to a specific entity for use at particularly scheduled times or on an as-needed basis, an overall rate of utilization of certain licensees' spectrum may actually be very low. The spectrum that is allocated to certain services, other than commercial mobile wireless voice and data communication and Wi-Fi services, may experience actual overall average use rates as low as 1%. For example, some government entities only require high use of their licensed spectrum in times of emergency. Theoretically, across the wireless spectrum, up to an estimated 4 GHz of spectrum is underused.

One industry solution that has been suggested would be to allow individual wireless devices to conduct autonomous spectrum sensing to detect unused spectrum and to tap into that spectrum for individual wireless device use on an ad hoc basis. This "open market" or "opportunistic" method, which allows the individual customer to seek out and use the most effective and most economical service regardless of how that service is delivered to the individual customer's wireless device, is not according to the current paradigm. This method appears, according to current technology, to pose a level of chaos that will not solve the problem. Additionally, spectrum holders whose spectrum may be accessed require full control of their spectrum at times without interference from randomly encroaching wireless devices. The spectrum sensing solution would disrupt such control and introduce interference. There may come a time when such an open market method may be feasibly implemented. At that time, it will be appropriate to include within that open market method a version of the brokering scheme discussed below.

Some have suggested that the allocation of spectrum should implement utility models based on fairness, content type, and differences in providers. This suggested solution is largely discounted as it is postulated to create fragmentation and lead to inefficiencies that would only exacerbate the currently-forecast difficulties. Others have suggested using cognitive pilot channels (wireless spectrum) to advertise available unused or underused spectrum. This "solution," however, would require use of additional spectrum to implement the advertising and would be largely uncontrolled leading to increased chaos. Use of static databases to locate unused spectrum has also been proposed, but is not considered dynamic enough to manage the problem longer term. Spectrum required by individual users for any given period in any given location is dynamically changing, particularly when the users are mobile. This calls for an equally dynamic automated solution by which to manage spectrum allocation.

The problems of overcrowding in certain portions of the spectrum can be alleviated by executing a disciplined scheme to tap into the underused portions of the spectrum in a manner that meets the requirements of all of the respective licensees.

In contrast to the open market method described above is a controlled market method. The controlled market method is based on the mobile cellular network operator/individual customer model that is in place today. An individual customer does not generally access any spectrum except through the licensed spectrum controlled by the mobile cellular network operator that provides the service and equipment to the individual customer. It is in this model that the mobile cellular network operator provides a contracted-for level of service with certain guarantees and disclaimers, while exercising some modicum of control. For example, based on this relationship, the mobile cellular network operator can throttle an individual customer's access to wireless communications by slowing the rate at which those communications are provided to the individual customer's wireless device. The mobile cellular network operator could also block data transmissions from reaching the individual customer's wireless device. The mobile cellular network operator can also control what applications an individual customer may be able to access, and what applications the individual customer's wireless device may support. Because the controlled market method is the method generally in place today, the balance of this disclosure will deal with implementation of the disclosed systems and methods in a controlled market. It should be recognized, however, that the systems and methods according to this disclosure may be equally enabled in an open market method if an open market method becomes the paradigm for supporting individual customers' wireless communication needs. Also, the term mobile cellular network operator is used to generically refer to any commercial provider that exclusively licenses spectrum in support of providing wireless data and voice communications to a number of individual customers/users on a for-fee basis.

Based on the above shortfalls, a new paradigm is emerging for optimizing global spectrum in a controlled environment. New to the wireless industry is a concept of temporary spectrum license rental/leasing as opposed to spectrum license sale via auction or secondary market transactions. Exclusive licensees of unused or underused spectrum may provide an amount of spectrum at a particular time, in a particular location, to the marketplace in which licensees requiring additional spectrum may acquire temporary access to offered spectrum for a fee or appropriate consideration. There is a push for regulations to allow licensed spectrum holders to temporarily transfer, e.g. rent/lease, access to their unused or underused spectrum to other entities requiring spectrum such as mobile cellular network operators. This creates a win-win situation where the other licensees gain access to additional spectrum resources, which would not otherwise be available, while the spectrum holders with unused spectrum get a financial incentive or other consideration. This may be particularly attractive to the large majority of licensed spectrum holders whose utilization is well less than 100%, but that are not able to relinquish the spectrum completely through sale or other transaction based on their need to keep the spectrum reserved to their own use in certain areas at certain times.

According to proposed schemes, multiple primary spectrum holders (PSH) of underused spectrum may act as spectrum suppliers. Multiple alternate spectrum holders (ASH), such as, for example, mobile cellular network operators, may seek to augment their own exclusively-licensed spectrum by renting spectrum from the spectrum suppliers as spectrum renters. The mobile cellular network operator needs to support its individual customers operating its individual wireless devices connected to the mobile cellular network. The mobile cellular network operator is in a best position to monitor the use of its network by its individual customers according to time and location. When the mobile cellular network operator determines that its licensed spectrum will not meet customer demand for a particular location at a particular time, e.g., busiest periods of the day, the mobile cellular network operator, acting as an ASH, may execute a transaction such as, for example, placing a real-time bid for spectrum, to temporarily acquire additional spectrum in a particular location at a particular time that has been made available by a PSH in a controlled marketplace.

Exemplary embodiments of the disclosed systems and methods propose means for implementing a cloud based spectrum management scheme that enables Dynamic Spectrum Access (DSA) through implementing transactions that provide temporary access to underused spectrum for a fee or other consideration according to a more optimum spectrum allocation. Prior to renting their spectrum, the PSH generally needs to be assured that it can regain control of its spectrum when a need arises. Exemplary embodiments are directed at ensuring that a clear mechanism to support such assurances is provided. As discussed in this disclosure, DSA generally refers to a scheme that allows PSH's to temporarily rent their spectrum to ASH's on the condition that the rented spectrum can be relinquished to the PSH on demand. It is estimated that implementation of such a scheme across all spectrum to 6 GHz may recover as much as 75% of the underused 4 GHz of spectrum for use by multiple ASH's. This complete recovery would require full implementation of the disclosed brokering scheme and full cooperation from all PSH's. Actual implementation may initially realize a recovery of spectrum at well less than 3 GHz as it is anticipated that certain PSH's may choose not to participate, and others may temper their participation, at least initially. To put the above numbers in some perspective, however, it should be realized that a 500 MHz recovery would effectively double the amount of spectrum currently available for mobile cellular network communications. The disclosed brokering scheme, properly administered, may provide an incremental step-wise approach to solving the long-term spectrum shortage.

A challenge in achieving an efficient and scalable DSA scheme that becomes economically viable is effective spectrum management. In other words, given the temporary lease of spectrum to different operators or users, in different locations, for different time periods, a challenge resides in determining how best to coordinate the leasing of the spectrum so that the brokering scheme maximizes: (1) the incentive for the ASH's; (2) the incentive for the PSH's and (3) experience for the user/operator that is paying for that spectrum (ideally, with minimal cost), all while avoiding interference and assuring the PSH that its spectrum is recoverable on demand. The term lease here is intended to be used interchangeably with the term rental. This is an optimization problem that lends itself to the use of computational analytics. Currently, there are no known global spectrum management schemes with computational analytics across networks employing DSA. While mobile cellular network operators do make use of spectrum management within their own networks, there is no cross-network, or cross-operator, spectrum management between potential ASH's. Today, with spectrum exclusively licensed, there has been no push for a large scale spectrum management. However, with future spectrum exhaustion of exclusively-licensed spectrum expected by carriers, the larger pool of rented spectrum described in this application provides a greater pool of spectrum resources from which to optimize utilization, i.e., optimization would no longer be limited to just the local spectrum resources of each individual carrier.

Based on the complexity of the problem, a global brokering scheme, likely overseen in the United States by, for example, the Federal Communications Commission (FCC) and/or the National Telecommunications and Information Administration, is proposed that will facilitate optimizing the spectrum allocation from a global perspective. In this context, the term global spectrum broker is intended to refer to the aggregation of systems and methods implemented regionally, to oversee and administer the marketplace in which transactions for spectrum optimization occur. Numbers and sizes of the regions that are each overseen by a global spectrum broker are variable according to characteristics of the spectrum usage in a particular region and the availability of the computational resources to manage the global brokering scheme. The global spectrum broker is not going to concern itself with internal allocation undertaken by, for example, individual ASH's, such as mobile cellular network operators, once spectrum is rented. Individual ASH's will undertake local spectrum management schemes that may interact with the global brokering scheme as they estimate their spectrum requirements, and determine what price they are willing to pay for additional spectrum to meet those spectrum requirements. Once the PSH provides the relevant parameters of additional spectrum for rent, the local brokering scheme will undertake an allocation according to agreements that are likely contractual with individual customers. This may include a tiered service approach based on what individual customers are paying for their service, and associated service guarantees.

In exemplary embodiments, optimization of the spectrum for rent is provided in the aggregate by the global spectrum broker across multiple operators and on a regional basis. Once the operators are allocated additional spectrum according to the optimization undertaken by the global spectrum broker, the individual operators will then optimize access to their network according to the combination of their exclusively-held spectrum and the additional (optimally rented) spectrum added to augment their primary spectrum. Mobile carriers may optionally offer spectrum for rental during low demand periods in certain regions serving potentially both as a PSH and an ASH.

The proposed two-level analytics approach may provide the required intellectual scheme by which to implement a global/local brokering scheme to facilitate optimization of spectrum use in a dynamic, possibly real-time transaction process in which a PSH with underused spectrum may specify amounts, prices, locations, durations and frequencies of spectrum to be offered for rent to ASH's that need additional spectrum.

Exemplary embodiments may provide allocation of spectrum according to a specified transaction process in a dynamic marketplace that guarantees to the PSH return of the spectrum, as needed, according to negotiated, specified and/or listed constraints.

Exemplary embodiments may provide an automated system to coordinate two levels of optimization, a first level being across multiple operators on a global (regional) scale, and a second level being with regard to individual ASH's in support of their relationships with their individual customers.

Exemplary embodiments may provide an automated system that is responsive to an individual customer's, or group of customers' needs as interpreted by the ASH with whom the customers deal for allocation of wireless data communication services.

Exemplary embodiments may facilitate multiple geographically dispersed (i.e., distributed) global spectrum brokers in implementing an optimization scheme for available spectrum based on information provided by PSH's, and requirements levied by ASH's.

Exemplary embodiments may provide regional deconstruction, as well as frequency deconfliction, between individual mobile cellular network operators operating in a same, or in very closely-related, geographic location(s), undertaken by the global spectrum broker.

Exemplary embodiments may provide a mechanism by which to allocate spectrum to an individual ASH, e.g., a wireless network operator, based on what the individual wireless network operators are willing to pay (or otherwise provide compensation) for the service, while tracking the spectrum as it is allocated to, in return, guarantee to the PSH that the spectrum can be recalled when the PSH needs it to fill any requirement of its own without interference by individual users operating under the umbrella of the mobile cellular network operator that rented the spectrum for a particular time to service its individual customers.

The allocation of the temporary resource will be highly localized and require that the allocated temporary resource can be returned to the control of the primary resource owner according to the terms of the above-discussed agreement regarding the primary spectrum holder's individual preemptive and/or prioritized needs for that resource.

The rental scheme may be very dynamic including on the order of renting for seconds or even milliseconds for access. This task is to be undertaken by a server or a series of servers at two different levels to provide a level of responsiveness that mirrors individual users' requirements. The implementation of the service is going to be based on machine-implemented decisions that the two-level analytics represent. A series of mathematical algorithms are used to optimize the transaction and implementation process for sharing of rented spectrum from a PSH. The computationally-intense operations seek to optimize spectrum allocation in a controlled manner for a given location at a given time in a given frequency across multiple PSH's and ASH's.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing two-level analytics to achieve large scale, scalable and efficient spectrum management for networks using spectrum allocated through a DSA scheme that allows spectrum holders to temporarily "rent" access to the spectrum they hold to other spectrum holders will be described, in detail, with reference to the following drawings, in which.

DETAILED DESCRIPTION OF THE DISCLOSED EMBODIMENTS

The systems and methods for implementing two-level analytics to achieve large scale, scalable and efficient spectrum management for networks using spectrum allocated through a Dynamic Spectrum Access (DSA) scheme that allows spectrum holders to temporarily "rent" access to the spectrum that they hold to other spectrum holders will generally refer to this specific utility for those systems and methods. Exemplary embodiments described and depicted in this disclosure should not be interpreted as being specifically limited to any particular analytics approach, to making use of any particular program for implementing the analytics approach, or to any specific system infrastructure for a particular network or individual customer mobile devices for use within that network.

While specific reference is made throughout this disclosure to application of the disclosed systems and methods to a conventionally understood "controlled market" method for providing wireless communication services, it should be understood that the systems and methods according to this disclosure are not limited to the conventionally understood "controlled market" method. The systems and methods according to this disclosure may be equally applicable to any method for providing wireless communication service. The discussion is limited to application to the "controlled market" method only for familiarity and ease of understanding of the proposed implementation.

Specific reference to, for example, any particular wireless device or mobile cellular network configuration should be understood as being exemplary only, and not limited, in any manner, to any particular class of wireless devices used in any particular configuration of a wireless network, whether fixed or mobile.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Review of spectrum utilization indicates that there are certain peak times when, for example, mobile cellular networks are saturated and other times when the traffic is less dense. This traffic saturation may be geographically diverse. This applies not only to mobile cellular network operations, but also applies to other portions of the wireless communication spectrum. Consider, for example, differences in levels of military traffic within their spectrum bands around, for example, the large naval bases in San Diego, Calif. and Norfolk, Va., and the significantly less dense traffic on military wireless channels that may be experienced, for example, in some portions of the Midwest. So there are numerous dimensions to the spectrum analysis and utilization problem for both primary spectrum holders (PSH's) and potential alternate spectrum holders (ASH's). There is a location or geographic dimension to the problem, and there is also a time dimension. Back to the utilization in the vicinity of San Diego and Norfolk, peak utilization may occur generally between 8 AM and 4 PM local time on weekdays, while utilization outside those times is significantly less. Further, there is a frequency aspect to the spectrum analysis and utilization problem. Certain frequency bands are implemented with equipment providing less capability for particular users, compared to mobile cellular networks implemented according to today's more capable technologies and standards. Thus, the frequency bands that may be rented may be judged on the basis of providing the best capability for the ASH, e.g., mobile cellular network operators, and the frequency bands need to be non-interfering between competing mobile cellular network operators that may employ spectrum at particular frequencies. As such, any optimization scheme for spectrum use must address at least these three dimensions. Each of time, space and frequency utilization may need to be dynamically optimized.

A global spectrum broker alone may not be able to manage all of the optimization, even over a small region, among competing mobile cellular network operators in a timely enough manner to keep up with the demands of individual devices. For example, mobile cellular network operators may be unable, or unwilling, to disclose sufficient dynamic utilization details for the global spectrum broker to make optimized allocations. For this reason, the mobile cellular network operators may perform some of the optimization. Users of the spectrum, such as, for example, public safety agencies, satellite network operators or other government agencies, may, through the disclosed brokering system, dynamically advertise their spectrum availability. With implementation of such a spectrum marketplace, where transactions may take the form of auctions, the PSH's who know how often, how much, and generally at what times, they employ the spectrum exclusively licensed to them, may provide the details to a database operated by the global spectrum broker, to indicate periods when their spectrum is available for rental, in order that potential ASH's as entities that require additional spectrum services, perhaps at specific times in specific locations, may bid in advance or in real-time) on the listed periods of spectrum provided to the auction by one or more PSH's in order to maintain a particular quality of experience for their customers even during times of peak utilization of, for example, an operator's mobile cellular network.

The FCC and/or the NTIA in the United States, as spectrum regulators, will likely oversee such a brokering system according to certain specified rules but will leave it to industry to develop and implement the brokering system in a manner that is flexible to the market needs. The regulator, therefore, may choose to entrust a single entity, or group of entities, to act as the global spectrum brokers overseeing the automated systems by which the spectrum brokering scheme is enabled. Such global spectrum brokers would need to be impartial to the needs of the many and widely diverse ASH entities, such as mobile cellular network operators, which may act as local spectrum brokers, in order that the process remains free from favoritism and potential claims regarding anti-competitive behavior for service provided to individual groups of customers.

Mobile cellular network operators, perhaps acting as local spectrum brokers, may bid on spectrum in a manner that affords them a temporary license for access to the spectrum during specific periods, according to specific frequencies, and in particular locations, to meet their demands for additional spectrum to provide a particular quality of experience to their users. The mobile cellular network operator is aware of the particular requirements to support individual customer devices within its network. For example, at 6 PM in New York City, cellular customers may stress the capacity of the local mobile cellular networks. Employing the disclosed brokering and barter system, the mobile cellular network operators operating those cellular networks may pay a premium to secure additional spectrum during those peak hours. It is recognized, however, that as the proliferation of individual cellular devices increases, those periods of peak demand will increase as well. Service guarantees to the mobile cellular network operators' customers may drive how much the mobile cellular network operator may be willing to bid at auction for the additional spectrum to guarantee a certain quality of experience for its users even during these peak periods.

The availability of the spectrum under the proposed brokering scheme will sometimes be subject to the PSH's ability to reclaim that spectrum on-demand. This capacity is part of the system that implements the disclosed brokering scheme. This requirement, with its level of uncertainty, may also drive the amount that the mobile cellular network operators are willing to bid for the spectrum. If, for example, it is more unlikely than likely that the spectrum will need to be reclaimed immediately in, for example, a peak period for operations of cellular devices on a particular cellular network, that spectrum may garner higher bids than spectrum that may be immediately recallable and is likely to be recalled on some routine basis during those periods of peak operations.

The global brokering scheme, therefore, may be available to oversee bidding for, and assignment of, listed spectrum according to a mechanism that can also inform the PSH regarding what entity or entities are "renting" its spectrum at any particular time. This may be appropriate so that the PSH may, directly or via the global spectrum broker, indicate to a renting ASH a need to recover the spectrum to the PSH's use. The brokering scheme is robust and repeatable according to these policies. The brokering scheme is able to guarantee a process for return of service upon request of the PSH. Ultimately, this warrantied level of service may be central to implementation of the brokering scheme. The PSH is assured as to a mechanism for recovering its spectrum, without interference by devices operating on the mobile cellular network whose operator bid for, and was awarded that spectrum in a particular period of time and location. In essence, the brokering scheme includes a virtual switch that turns off the services to the ASH in favor of the PSH when required.

Relationships between individual cellular customers and network operators, between the mobile cellular data network operators and the brokers, and between the PSH's and the brokers are all considered in the implementation of the disclosed brokering scheme.

As indicated above, the mobile cellular network operator may determine when its capacity in a particular location at a particular time is, or will become, saturated. The mobile cellular network operator then, acting as a local spectrum broker under the disclosed scheme, is the entity that may approach the global spectrum broker to negotiate for additional spectrum when those needs arise. There are many ways in which the interaction with the global spectrum broker may be undertaken. As an example, the mobile cellular network operator may define an amount of spectrum that the mobile cellular network operator desires in a particular location at a particular time, e.g., 20 MHz of spectrum in a specific frequency range, in downtown Manhattan between 5:30 and 8:30 PM every weeknight. Otherwise, in instances where the mobile cellular network operator chooses to be more circumspect regarding its specific requirements the mobile cellular network operator may define its spectrum requirements according to, for example, some menu of more generic data characteristics provided by the global spectrum broker, leaving the calculation of the spectrum allocation to meet the requirements to the global spectrum broker.

Figure 1:
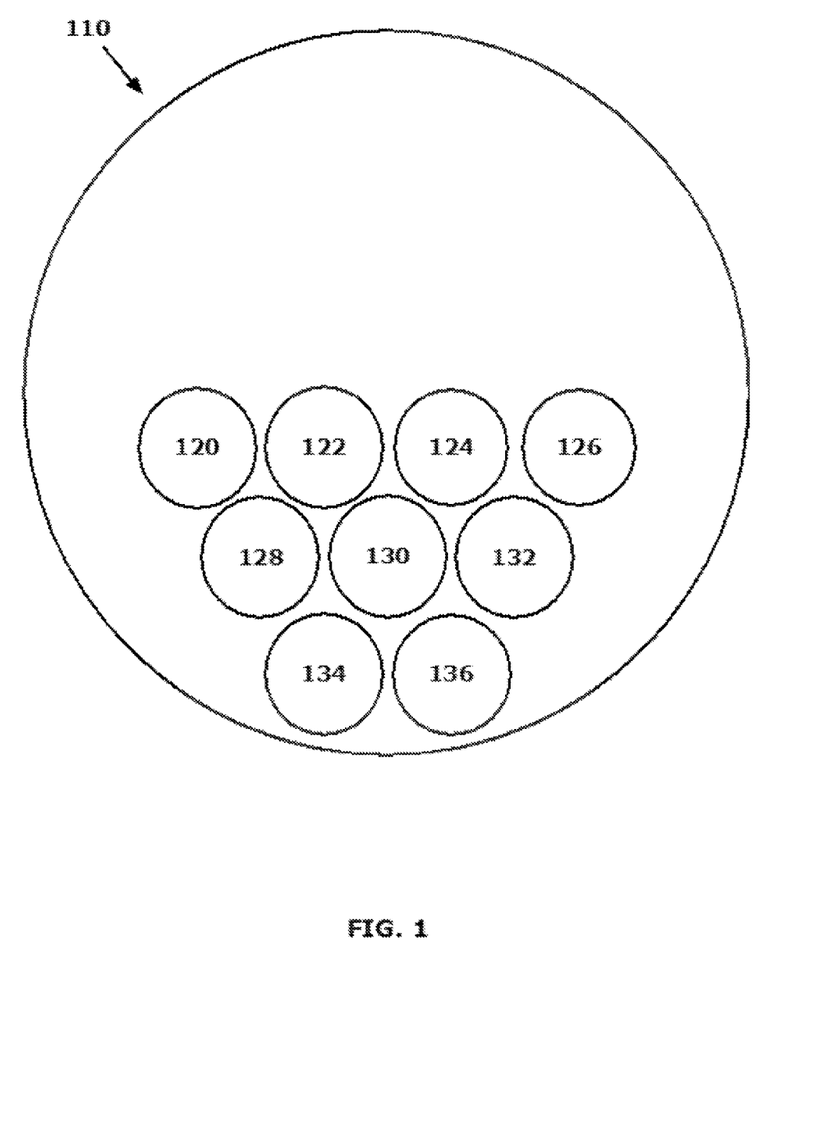
FIG. 1 illustrates an overview of an exemplary management scheme for a two-level analytics approach to achieving large-scale, scalable and efficient spectrum management for networks making use of spectrum allocated through DSA according to this disclosure.

FIG. 1 illustrates an overview of an exemplary management scheme for a two-level analytics approach to achieving large-scale, scalable and efficient spectrum management for networks making use of spectrum allocated through DSA according to this disclosure. As shown in FIG. 1, there is a two-level optimization, i.e., by brokers at two levels. In a specific region, there may be a global spectrum broker 110 overseeing brokering for the many spectrum components each representing a local spectrum broker 120-136 that in turn oversee optimization of spectrum use to individual customers. The global spectrum broker 110 represents a system and/or entity that is outside the span of control of any particular mobile cellular network operator to manage requests from different operators, which will likely be aggregated requests across several operators for a specific region. In this regard, information about any specific mobile cellular network operator and its customers may be effectively masked. The mobile cellular network operator will simply request a block of spectrum for a particular time in a particular location. The global spectrum broker 110 may make a best match, or a best allocation, of available spectrum from a PSH with a particular mobile cellular network operator's needs and price the requested spectrum accordingly. The global spectrum broker 110 may oversee the bidding on available spectrum and may allocate the available spectrum for rent according to the price paid by what is envisioned to be multiple competing mobile cellular network operators in a given location requiring spectrum at a particular time. The global spectrum broker 110 may additionally ensure frequency deconfliction between competing mobile cellular network operators, and may provide connectivity back to the PSH to ensure that the spectrum can be recovered on demand, as may be required. Because the disclosed brokering scheme operates according to a free-market model, individual mobile cellular network operators may be able to secure spectrum to support their customers' needs by paying a higher premium for that spectrum at auction.

Once the spectrum is allocated, it may be left up to the individual ASH to act as the local spectrum broker 120-136 to provide the additional spectrum coverage to its individual customers according to contractual obligations and/or guarantees of quality of service.

The two-level analytics approach optimizes the use of computational resources. The global spectrum broker 110 may perform optimization, for example, on a city-wide, or other regional, basis at a rate of update occurring at intervals of every few seconds. The local spectrum brokers 120-136 may perform localized computations for local optimization over smaller geographical regions within the global spectrum broker's coverage area. The area covered by the local spectrum brokers 120-136 may each be an area equivalent, for example, to one or a few cellular base stations. As a result of the smaller population size, the computations for optimization at the local spectrum broker level may occur significantly more frequently and involve less complexity due to the smaller number of variables. This brokering scheme allows the local spectrum brokers 120-136 to perform computations at rates approaching intervals, for example, of less than 100 ms, consistent with individual user response times. This bifurcation of effort minimizes computational complexity compared to all computations being performed by the global spectrum broker.

As each local computation is performed independently by the local spectrum brokers 120-136, over time the combined spectrum allocation across the entire region covered by the global spectrum broker 110 may begin to degrade due to the lack of coordination, in terms of interference, optimal spectrum assignment, user experience, or otherwise. To rebalance the system, the global spectrum broker 110 may use periodic global computations according to the intervals discussed above to optimize the allocation of spectrum across all of the local spectrum broker regions under its the purview. Each of these global spectrum computations may take as inputs the outputs from the local spectrum broker computations, will consider the current global spectrum allocation, will reference any emergent PSH requirements, and will generate, as an output, an optimal allocation of spectrum across all users, PSH and ASH, in the local geographical region covered by the global spectrum broker 110.

Figure 2:
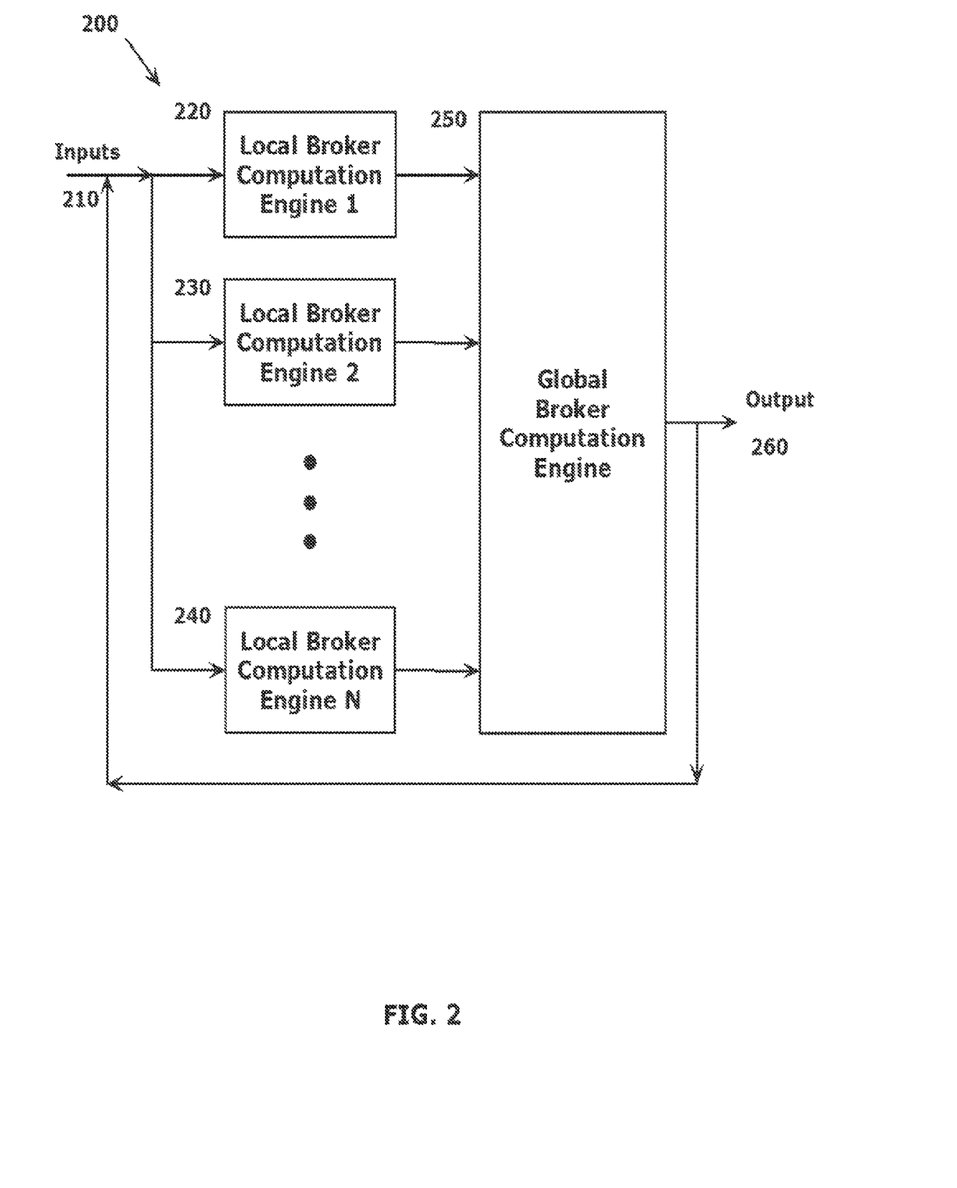
FIG. 2 illustrates an exemplary overview of a two-level analytics process for spectrum management according to this disclosure.

The above process of interaction between the local spectrum brokers 120-136 and the global spectrum broker 110 may be automated according to local computations and global computations as shown, for example, in FIG. 2. FIG. 2 illustrates an exemplary overview of the two-level analytics process 200 for spectrum management according to this disclosure. As shown in FIG. 2, the two-level analytics process may be implemented by inputs 210 being sent to a plurality of local spectrum broker computation engines (1-N) 220-240. Each of these local spectrum broker computation engines (1-N) 220-240 may be, for example, administered by a mobile cellular network operator in order to locally optimize spectrum allocation and to postulate spectrum requirements according to the above discussion to be provided to, and used by, the global computation engine 250 administered by the global spectrum broker. An output 260 from the global computation engine 250 generally comprises an optimized scheme for spectrum allocation across multiple users, including those multiple users administering the local spectrum broker computation engines (1-N) 220-240. As shown in FIG. 2, the output 260 from the global computation engine 250 may be fed back as part of the input process to the local spectrum broker computation engines (1-N) 220-240.

The depicted two-level spectrum management analytics, divided in the manner suggested by the depictions in FIGS. 1 and 2, may be realized, and implemented, using currently-known computational resources. For example, a single dedicated processor may represent the local computation engine and be capable of handling the local computation problem. The global computation engine 250 may require multiple processors and related computational resources. Estimates of the numbers of processors that may be appropriate depending on a size of the region covered by the global computation engine 250 may range from approximately 200 to 2000. The global computational algorithms may be implemented as distributed parallel algorithms involving relatively smaller numbers of processors, on the order of 10 to 100, interconnected with enough bandwidth to handle 10 B/s to 100 GB/s of sustained aggregate interprocessor bandwidth.

Figure 3:
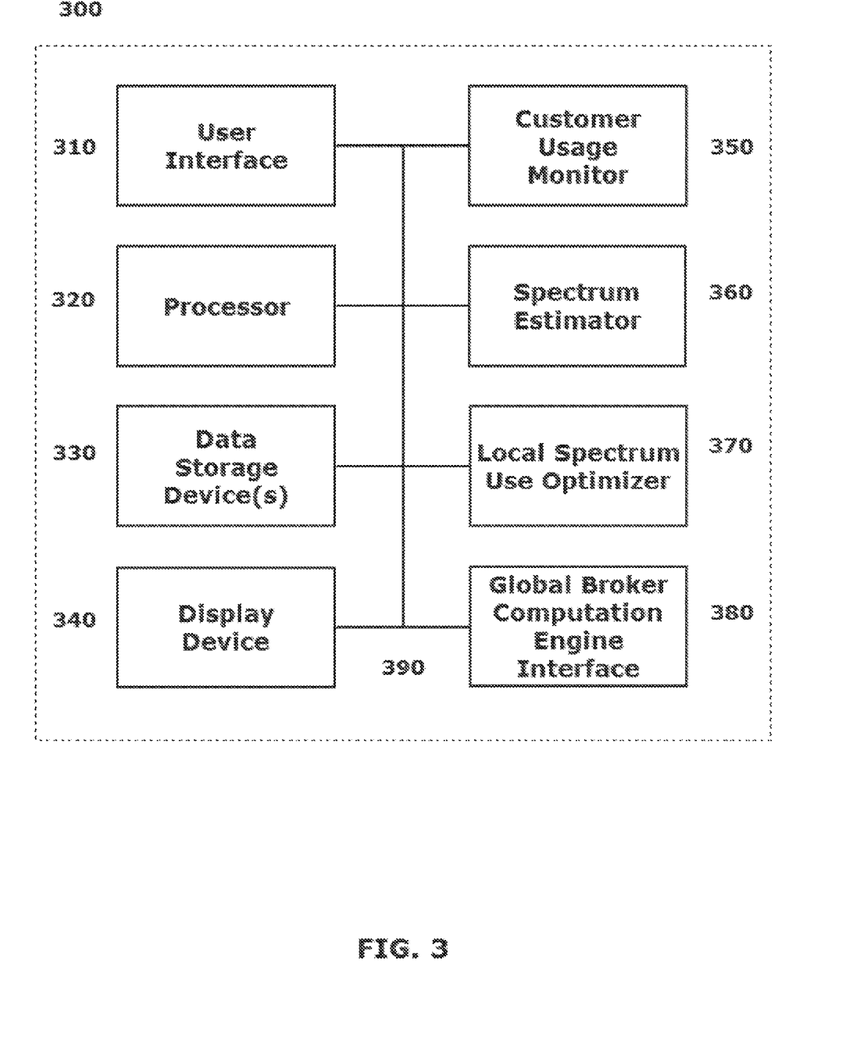
FIG. 3 illustrates a block diagram of an exemplary local spectrum broker computation engine to implement local optimization of the two-level analytics process for spectrum management according to this disclosure.

FIG. 3 illustrates a block diagram of an exemplary local spectrum broker computation engine 300 to implement local optimization of the two-level analytics process for spectrum management according to this disclosure.

The local spectrum broker computation engine 300 may include a user interface 310 by which the local spectrum broker, may make manual inputs to the local spectrum broker computation engine 300, and may otherwise communicate information via the local spectrum broker computation engine 300 to a global spectrum broker computation engine, as discussed below, with which the local spectrum broker computation engine 300 is in communication according to the two-level analytics scheme illustrated in FIG. 2. The user interface 310 may be configured as one or more conventional mechanisms that permit a user to make inputs to the local spectrum broker computation engine 300. The user interface 310 may include, for example, such mechanisms as a keyboard and mouse combination, an integral keyboard, or a touchscreen with "soft" buttons for communicating commands and information to the local spectrum broker computation engine 300. The user interface 310 may alternatively include a microphone by which an individual associated with the mobile cellular network may provide oral commands to the local spectrum broker computation engine 300 to be "translated" by a voice recognition program or otherwise. The user interface 310 may otherwise comprise simply a data port by which compilations of data to be input to the local spectrum broker computation engine 300 may be read from transportable digital media. In such a scenario, data required for operation of the local spectrum broker computation engine 300 may be compiled at, for example, separate user workstations and provided to the local spectrum broker computation engine 300 by physically, or otherwise, transferring the digital data media from the workstation at which the information is recorded to the local spectrum broker computation engine 300 to be read by a compatible digital data media reader acting as a user interface 310 in the local spectrum broker computation engine 300.

It is anticipated, for example, that information input to the local spectrum broker computation engine 300 via the user interface 310 will include identification of devices that individual customers use and information regarding specific contractual agreements between the mobile cellular network operator and the individual customers.

The local spectrum broker computation engine 300 may include one or more local processors 320 for individually undertaking the processing and control functions that are carried out by the local spectrum broker computation engine 300. Processor(s) 320 may include at least one conventional processor or microprocessor that interprets and executes instructions and processes outgoing and incoming control information and data via the different input and output channels for exchange of such information in the local spectrum broker computation engine 300.

The local spectrum broker computation engine 300 may include one or more data storage devices 330. Such data storage device(s) 330, which may include hard disk storage as well as solid-state devices, may be used to store data, and operating programs or applications to be used by the local spectrum broker computation engine 300, and specifically by the processor(s) 320. Data storage device(s) 330 may include a random access memory (RAM) or another type of dynamic storage device that stores information and instructions for execution by the processor(s) 320. Data storage device(s) 330 may also include a read-only memory (ROM), which may include a conventional ROM device or another type of static storage device that stores static information and instructions for execution by the processor(s) 320. The data storage device(s) 330 may be those that are integral to the local spectrum broker computation engine 300, or otherwise may be remotely located from, and accessible to, the local spectrum broker computation engine 300.

At least one of the data storage device(s) 330 may be designated to store information on contractual agreements between the mobile cellular network operator and its customers in order to facilitate optimization of spectrum to the individual users, as required. At least one other of the data storage device(s) 330 may be provided to store historical information on customer use trends and mobility patterns to further facilitate optimization of spectrum by predicting, for example, when, with regard to the specific location that the local spectrum broker computation engine 300 covers, requirements for spectrum will exceed the amount of spectrum that is available for that location covered by the mobile cellular network operator's exclusive license in that location.

The local spectrum broker computation engine 300 may include at least one data display device 340 by which the mobile cellular network operator may monitor status of operation of the local spectrum broker computation engine 300 to include negotiation for, and receipt of, additional spectrum when required, as well as optimization of that spectrum according to at least overall availability of spectrum and agreements with individual customers. The data display device 340 may be configured as one or more conventional mechanisms that display information to a user of the local spectrum broker computation engine 300 for operation of the local spectrum broker computation engine 300, or otherwise for displaying information such as that discussed above.

The local spectrum broker computation engine 300 may include at least one customer usage monitor 350. The at least one customer usage monitor 350 may be employed to provide to the local spectrum broker computation engine 300 an indication of instantaneous use of the mobile cellular network operator's network in real time or near real-time in order to provide real-time or near real-time inputs to other components of the local spectrum broker computation engine 300 to facilitate local spectrum use optimization undertaken by the local computation engine 300. Information received via the customer usage monitor 350 may, for example, be stored in one or more of the data storage device(s) 330 for reference in determining current spectrum optimization requirements and anticipated spectrum deficiencies, the latter potentially including storing information for later assessment of updated peaks in customer usage requirements. The customer usage monitor 350 may also include an ability to transmit to customers an indication of spectrum usage should the mobile cellular network operator desire to provide such information to its customers.

The local spectrum broker computation engine 300 may include a separate spectrum estimator 360. The spectrum estimator 360 may operate autonomously, or in combination with the processor 320 and/or one or more the data storage devices 330, to estimate when spectrum availability may be exceeded. The spectrum estimator 360 may, according to some pre-programmed scheme or otherwise, generate a request for additional spectrum to be transmitted from the local spectrum broker computation engine 300 to the global spectrum broker, as well as an offer regarding what the mobile cellular network operator is willing to bid or otherwise compensate for the additional spectrum to meet its requirements. The spectrum estimator 360 may, therefore, provide a mechanism by which to continuously bid for additional spectrum on an as needed basis. The spectrum estimator 360 may operate according to an update rate with intervals of less than 100 ms in order to respond to immediate customer requirements on an as needed basis when available spectrum based on a mobile cellular network operator's exclusive license is exceeded.

The local spectrum broker computation engine 300 may include a local spectrum use optimizer 370. As with the spectrum estimator 360, the local spectrum use optimizer 370 may operate autonomously, or in combination with the processor 320 and/or one or more of the data storage device(s)

330, to constantly or near constantly, i.e., at update rates comparable to those discussed above for the spectrum estimator 360, update an optimization of local spectrum use according to monitored customer requirements, agreements with particular customers regarding a level of service that they are guaranteed, and/or an overall available spectrum that includes spectrum exclusively licensed to the mobile cellular network operator and any additional spectrum that has been bid for and received from the global spectrum broker to meet heightened needs for spectrum at a specific time in the location covered by the local spectrum broker computation engine 300.

The local spectrum broker computation engine 300 may include a global spectrum broker computation engine interface 380 as a specific interface for exclusive communication with the global spectrum broker computation engine for transmitting to the global spectrum broker computation engine information regarding additional spectrum requests in a given location and bidding on those additional spectrum requests, and receiving from the global spectrum broker computation engine information regarding the status of an auction or other transaction for additional spectrum in response to requests and bids, acquisition of additional spectrum as a result of the transaction process, and any requirements to return the additional spectrum on demand based on the global spectrum broker computation engine being informed by a PSH of its own requirement for the return of the spectrum.

All of the various components of the local spectrum broker computation engine 300, as depicted in FIG. 3, may be connected by one or more data/control busses 390. The data/control bus(ses) 390 may provide internal wired or wireless communication between the various components of the local spectrum broker computation engine 300, as all of those components are housed integrally in the local spectrum broker computation engine 300, or as all or some of the components are remotely located and in wired or wireless communication with the other components of the local spectrum broker computation engine 300.

It is anticipated that the various disclosed elements of the local spectrum broker computation engine 300 may be arranged in combinations of sub-systems as individual components or combinations, integral to a single unit or remotely dispersed as a plurality of elements or sub-units comprising the local spectrum broker computation engine 300.

Figure 4:
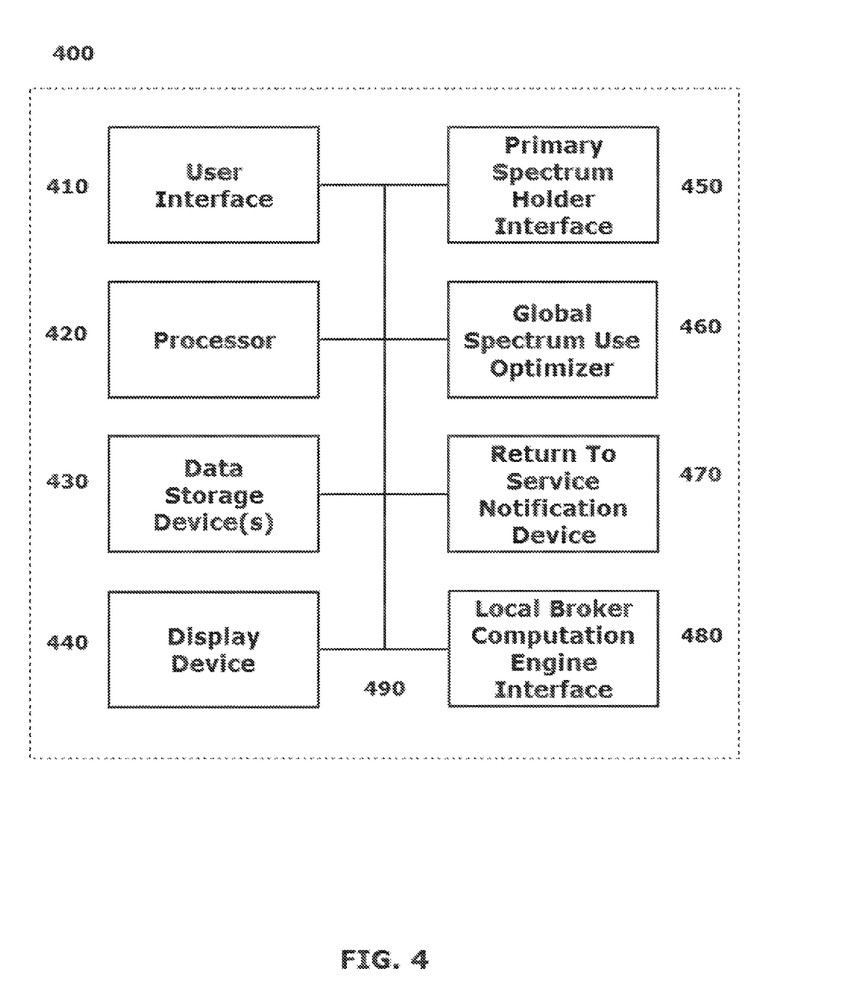
FIG. 4 illustrates a block diagram of an exemplary global spectrum broker computation engine to implement global optimization of the two-level analytics process for spectrum management according to this disclosure.

FIG. 4 illustrates a block diagram of an exemplary global spectrum broker computation engine 400 to implement global optimization of the two-level analytics process for spectrum management according to this disclosure.

The global spectrum broker computation engine 400 may include its own user interface 410 by which individuals associated with the global spectrum broker computation engine 400 may communicate with the other components of the global spectrum broker computation engine 400. The user interface 410 in the global spectrum broker computation engine 400 may include similar devices to those described above with reference to the user interface 310 in the global spectrum broker computation engine 300. Particularly, the user interface 410 may comprise a portable data storage medium and compatible data storage medium reader that may be employed to input data and/or instructions to the global spectrum broker computation engine 400.

It is anticipated that information regarding available additional spectrum from PSH's and information regarding spectrum requests including bids in support of those spectrum requests from local spectrum broker computation engines (see FIG. 3) will be received and dealt with automatically by other channels in the global spectrum broker computation engine 400, thereby bypassing any need for this information, for example, to be manually input via the user interface 410, regardless of what form the user interface takes.

The global spectrum broker computation engine 400 may include one or more processors 420 that are configured to carry out the processing and control functions that are undertaken by the global spectrum broker computation engine 400. It is anticipated that specific auction and optimization functions will be directed and implemented by other devices in the global spectrum broker computation engine 400, autonomously or under the direction of the processor(s) 420 based on information provided to the global spectrum broker computation engine 400 via specified communication paths, as discussed in detail below.

The global spectrum broker computation engine 400 may include one or more data storage devices 430. The data storage device(s) 430 may be used, for example, to store dynamic information regarding available spectrum provided by PSH's, spectrum requests and bids in support of those spectrum requests provided by potential ASH's, and spectrum currently being rented by an ASH, as allocated by the global spectrum broker computation engine 400, including identification of the ASH to facilitate a mechanism by which the global spectrum broker computation engine 400 may recover the rented spectrum from the ASH on the occasion that the PSH notifies the global spectrum broker of requirement to recover the rented spectrum.

The global spectrum broker computation engine 400 may include its own display device 440 that may be configured as a conventional display device by which to inform individuals associated with the global spectrum broker computation engine 400 regarding operation of the global spectrum broker computation engine 400 and/or the status of any information exchanged with PSH's and potential ASH's, as appropriate. The display device 440 may be of any conventional configuration that facilitates dissemination of the above categories of information to one or more individuals associated with the global spectrum broker computation engine 400, including for monitoring purposes.

The global spectrum broker computation engine 400 may include a primary spectrum holder interface 450 by which the global spectrum broker computation engine 400 is able to communicate with PSH's in order to receive from them information about their underused spectrum that is available for rent in a given location. The primary spectrum holder interface 450 of the global spectrum broker computation engine 400 may be able to provide to the PSH's information regarding whether, and when, the spectrum that they made available has been taken for use according to a global optimization scheme. The information provided to the PSH's from the global spectrum broker computation engine 400 via the primary spectrum holder interface 450 may include information regarding which ASH has rented the spectrum made available by the PSH's in order that, should the need arise, the rented spectrum can be most easily recovered from those ASH. The primary spectrum holder interface 450 may be configured to facilitate wired or wireless communication with a plurality of PSH's.

The global spectrum broker computation engine 400 may include a global spectrum use optimizer 460. As with the local spectrum use optimizer shown in FIG. 3, the global spectrum use optimizer 460 may operate autonomously, or in combination with the processor 420 and/or one or more of the data storage device(s) 430, to update an optimization of global spectrum use across multiple ASH's according to information provided by PSH's regarding available spectrum and ASH's regarding overall use of rented spectrum to the benefit of all.

Update rates for the global spectrum use optimizer 460 may be significantly slower than update rates for the local spectrum use optimizer shown in FIG. 3, and as described above. Update intervals for the global spectrum use optimizer 460 are anticipated to be in a range of one or more seconds. Such an update rate, strikes a balance between reasonably recurring optimization on a global scale and computing power necessary to carry out that function.

The global spectrum broker computation engine 400 may include a return to service notification device 470. Such a device may be provided to facilitate return of the rented spectrum from the using ASH to the PSH to which the spectrum is licensed. The return of service notification device 470 may receive, via the primary spectrum holder interface 450, an indication that the PSH requires return of its spectrum in a given location and within a specified timeframe. The return service notification device 470 may format a message to be sent to the ASH's indicating the need to return the spectrum. Upon receipt of such a message via, for example, a local spectrum broker computation engine interface 480, which is configured to communicate with the global spectrum broker computation engine interface shown in FIG. 3, the ASH will modify its operations with respect to its individual customers to free up the rented spectrum and to return it to the PSH within the specified timeframe, taking appropriate steps to ensure interference free operation in the returned spectrum.

The global spectrum broker computation engine 400 may include a local spectrum broker computation engine interface 480 as a specific interface for communication with the local spectrum broker computation engines with which it is associated for transmitting to the local spectrum broker computation engines information regarding additional spectrum that the ASH has "won" at auction according to its additional spectrum request and the bidding it submitted to support that additional spectrum request. The global spectrum broker computation engine 400 may provide to the local spectrum broker computation engines, via the local spectrum broker computation engine interface 480 other information, for example, regarding the status of an auction for additional spectrum. The global spectrum broker computation engine 400 may receive from the local spectrum broker computation engines information regarding additional spectrum requests and their bids for additional spectrum via the local spectrum broker computation engine interface 480.

All of the various components of the global spectrum broker computation engine 400, as depicted in FIG. 4, may be connected by one or more data/control busses 490. The data/control bus(ses) 490 may provide wired or wireless communication between the various components of the global spectrum broker computation engine 400, whether locally housed together in a single facility or remotely dispersed in multiple individual facilities.

It should be appreciated that, although depicted in FIG. 4 as an integral unit, the various disclosed elements of the global spectrum broker computation engine 400 may be arranged in any combination of sub-systems as individual components or combinations, housed in a single location or remotely dispersed in multiple locations and in wired or wireless communication with other of the individual components of the global spectrum broker computation engine 400. In other words, no specific configuration as an integral unit or as a support unit, or as several units or sub-systems widely dispersed, for the global spectrum broker computation engine 400 is to be implied by the depiction in FIG. 4.

Figure 5:
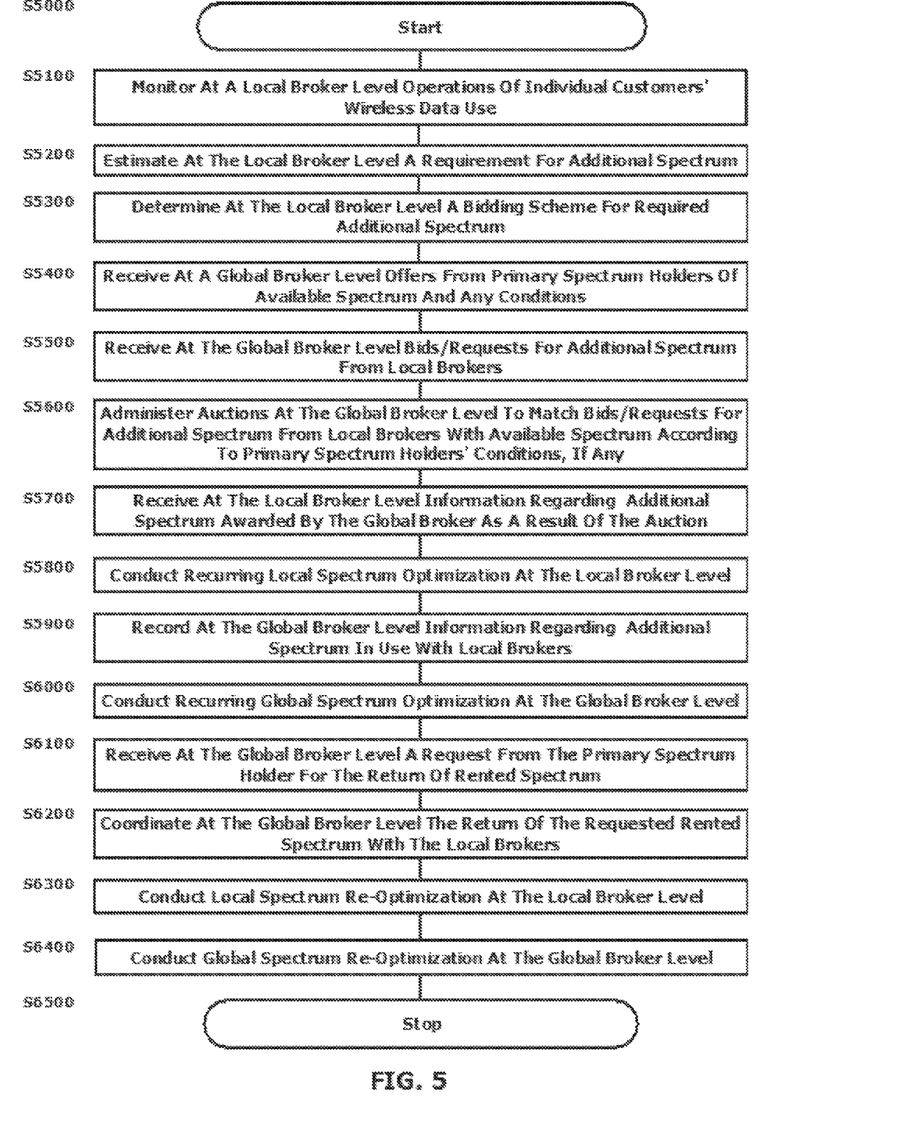
FIG. 5 illustrates a flowchart of an exemplary method for implementing a two-level analytics process for spectrum management according to this disclosure.

The exemplary embodiments may include a method for implementing a two-level analytics process for spectrum management to support DSA. FIG. 5 illustrates such an exemplary method. As shown in FIG. 5, operation of the method commences at Step S5000 and proceeds to Step S5100.

In Step S5100, monitoring occurs at a local spectrum broker level of operations of individual customers' wireless data use. The local spectrum broker level may coincide with regional operations of, for example, a mobile cellular network operator. It is the local mobile cellular network operator, acting as a local spectrum broker, that is in a best position to undertake the monitoring function required of the local spectrum broker according to a controlled market method. Should the industry transition to an open market method, the local spectrum broker level may be redefined, but will generally include an area approximating the size of an area covered by regional operations of a mobile cellular network operator. Update rates for the monitoring in Step S5100 are intended to keep pace with user needs, e.g., at intervals of 100 ms or less. Operation of the method proceeds to Step S5200.

In Step S5200, the local spectrum broker may estimate a requirement for additional spectrum. This estimate may be based on, for example, a multi-parameter analysis of historic usage information or various other statistical usage measures in the region covered by the local spectrum broker and/or the monitored levels of individual customers' wireless data use at any given time. Operation of the method proceeds to Step S5300.

In Step S5300, once a determination is made that additional spectrum may be required at a particular time for the location covered by the local spectrum broker, the local spectrum broker may then determine, or otherwise implement, a bidding scheme designed to immediately, or at a pre-determined time in the future, obtain from the global spectrum broker additional spectrum to cover the local spectrum broker's time-based requirements to meet individual customers' needs. The bidding scheme may be according to some pre-determined and stored set of bidding constraints established for the local spectrum broker. The bidding scheme may also include a multiple-step process involving first a reservation of PSH spectrum resources at a declared priority (or multiple levels of priority), and later the actual use of some or all the reserved spectrum via a tiered pricing scheme. The bidding scheme may include a pre-agreed schedule of fees for cancelled reservations. For example, the speculative estimation of near-term network congestion by the local spectrum broker could trigger an anticipatory reservation of PSH spectrum, but the actual network load may not reach predicted levels and/or only a portion of the reservation of spectrum may be needed. Operation of the method proceeds to Step S5400.

In Step S5400, PSH's may communicate with a global spectrum broker, whose coverage area encompasses a plurality of local spectrum brokers, to offer unused portions of their licensed spectrum in a given location to the global spectrum broker in order that the global spectrum broker may offer those portions of the PSH's licensed spectrum to local spectrum brokers for rent in an auction or other transaction process administered by the global spectrum broker. Operation of the method proceeds to Step S5500.

In Step S5500, requests for additional spectrum and bids in support of those requests are communicated from the local spectrum broker to the global spectrum broker in the global spectrum broker's role of administering a transaction process for spectrum that has been made available by the PSH's according to any conditions levied by the PSH's. Operation of the method proceeds to Step S5600.

In Step S5600, the global spectrum broker may administer, for example, one or more auctions, or a recurring auction process, to match local spectrum broker requests and bids for additional spectrum with spectrum made available from the PSH's. The grant of any spectrum made available by any PSH by the global spectrum broker may be subject to (1) conditions imposed by regulators, (2) conditions imposed by the PSH, and (3) recall by the PSH when conditions arise that require the PSH to communicate in a particular region using any extent of its licensed spectrum that was offered for use and has been rented by any local spectrum broker, subject to the terms of any recall agreement between ASH's and a particular PSH. Operation of the method proceeds to Step S5700.

In Step S5700, information may be communicated to the local spectrum broker regarding additional spectrum that has either been reserved or made available to the local spectrum broker based on an outcome of the auction or other transaction administered by the global spectrum broker. Such information may include any conditions on the reservation or the rental of the spectrum and/or a process for the local spectrum broker to administer "on demand" return of the spectrum, if required. Operation the method proceeds to Step S5800.

In Step S5800, the local spectrum broker may allocate the additional spectrum provided to it as a result of the transaction to its customers according to a recurring local spectrum optimization process. This sub-allocation to ASH customers need not be communicated to the global spectrum broker or the PSH, depending on the arrangement between the ASH, the global spectrum broker, and the PSH. It is anticipated that the individual customers may be wholly unaware of the spectrum augmentation made possible by the additional rented spectrum. Rather, the local spectrum broker may simply optimize a total spectrum allocation including exclusively-licensed spectrum and additional rented spectrum to meet individual customer wireless data use requirements. It is anticipated that this optimization will routinely occur at intervals matching those of the monitoring discussed in Step S5100 above, i.e., at intervals of 100 ms or less to match customer access needs. Operation of the method proceeds to Step S5900.

In Step S5900, the global spectrum broker may be tasked with maintaining records regarding disposition of the additional spectrum awarded by auction and in use by local spectrum brokers. The global spectrum broker may be tasked with maintaining such a record in order that, when a request from a PSH for return of its spectrum is received by the global spectrum broker, the global spectrum broker may communicate with the one or more local spectrum brokers currently using that spectrum to immediately release that spectrum back to the global spectrum broker for use by the PSH according to its requirements. Operation of the method proceeds to Step S6000.

In Step S6000, the global spectrum broker may review allocations of additional spectrum to the local spectrum brokers in a recurring global spectrum optimization process. The global spectrum broker will optimize a total spectrum scheme across the plurality of local spectrum brokers according to their requirements. This optimization may routinely occur at intervals on the order of one second or more as the global spectrum broker balances a requirement to maintain optimized spectrum across the region under its purview with maintaining a level of computational overhead that does not become excessive. Operation the method proceeds to Step S6100.

In Step S6100, the global spectrum broker may receive a request from a PSH for the return of its rented spectrum. Full implementation of the method may only be realized with full cooperation of participating PSH's and/or ASH's. This cooperation may be predicated on pre-arranged conditions that some or all of the offered and rented spectrum is recoverable on demand, or within a pre-defined interval or a tiered schedule, by the PSH, and where the PSH expects to resume communications on the rented spectrum without interference from users of the rented spectrum. Operation of the method proceeds to step S6200.

In Step S6200, the global spectrum broker may be tasked with coordinating the return of the requested rented spectrum from the local spectrum brokers to the PSH on demand by the PSH. The global spectrum broker will communicate the requirement for the local spectrum brokers to discontinue use of some or all of the additional rented spectrum in order that the PSH can exercise full or partial use of its licensed spectrum in the region covered by the global spectrum broker. Operation the method proceeds to Step S6300.

In Step S6300, upon relinquishing the rented spectrum, the local spectrum brokers may conduct spectrum re-optimization according to their currently-available spectrum, including the use of previously-reserved spectrum, i.e., spectrum that was reserved on stand-by for cases such as this where a portion of rented spectrum was recalled on demand by a PSH. It is recognized that this re-optimization may result in reducing quality of service to some portion of the local spectrum brokers' customers should an untimely request to return rented spectrum need to be implemented during a period of peak use for customers of the local spectrum broker, and the local spectrum broker has no spectrum reserved on stand-by, for example, from a different PSH. Operation of the method proceeds to Step S6400.

In Step S6400, the global spectrum broker may conduct spectrum re-optimization in order to otherwise meet local spectrum brokers' interrupted requirements based on the need for the local spectrum broker to return rented spectrum for use by the PSH. Optimization at both the local spectrum broker level and the global spectrum broker level are intended to continually keep pace with the user wireless data use requirements by appropriately bifurcating responsibilities for optimization between the global spectrum broker level and the plurality of local spectrum brokers under the umbrella of a specific global spectrum broker. Operation of the method proceeds to Step S6500, where operation of the method ceases.

The disclosed embodiments may include a non-transitory computer-readable medium storing instructions which, when executed by a processor or multiple processors, may cause the processor or multiple processors to execute all or some of the steps of a method as outlined above at different levels.

The above-described exemplary systems and methods reference certain conventional terms and components to provide a brief, general description of a suitable communication and processing environment in which the subject matter of this disclosure may be implemented for familiarity and ease of understanding. Although not required, embodiments of the systems and methods according to this disclosure may be provided, at least in part, in a form of hardware circuits, firmware or software computer-executable instructions to carry out the specific functions described, including program modules, being executed by a processor or processors. Generally, program modules include routine programs, objects, components, data structures, and the like that perform particular tasks or implement particular data types.

Those skilled in the art will appreciate that other embodiments of the disclosed subject matter may be practiced with many types of communication equipment and computing system configurations.

Embodiments may also be practiced in distributed network communication environments where tasks are performed by local and remote processing devices, at either or both of the local spectrum broker level and the global spectrum broker level, generally as outlined above, that are linked to each other by hardwired links, wireless links, or a combination of both through a communication network. In a distributed network environment, program modules may be located in both local and remote data storage devices.

Embodiments within the scope of this disclosure may also include non-transitory computer-readable media having stored computer-executable instructions or data structures that can be accessed, read and executed by processors at the local spectrum broker level and at the global spectrum broker level using a compatible data reader. Such computer-readable media can be any available media that can be accessed by a processor or processors. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. Combinations of the above should also be included within the scope of the computer-readable media for the purposes of this disclosure.

The exemplary depicted sequence of executable instructions, or associated data structures for executing those instructions, represents one example of a corresponding sequence of acts for implementing the functions described in method. The steps of the method, as depicted and described, are not intended to imply any particular order to the depicted steps except as may be necessarily inferred when one of the depicted steps is a necessary precedential condition to accomplishing another of the depicted steps. Many of the operations at the local and the global spectrum broker levels may occur in parallel.

Although the above description may contain specific details, they should not be construed as limiting the claims in any way. Other configurations of the described embodiments of the disclosed systems and methods are part of the scope of this disclosure. This enables each user to use the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for implementing dynamic spectrum access, comprising: obtaining, by a centralized processor, information from first entities regarding available spectrum in a particular geographic region;
   obtaining, by the centralized processor, requests for available spectrum from second entities, including an indication of at least one of a form of monetary compensation or other consideration that the second entities offer to secure additional spectrum made available by the first entities in the particular geographic region;
   executing, by the centralized processor, a transaction scheme to provide to individual ones of the second entities portions of the spectrum made available by the first entities in the particular geographic location for a prescribed period of time;
   informing, by the centralized processor, the individual ones of the second entities of the provision of the portions of the spectrum for the prescribed period of time according to the executed transaction scheme;
   executing, by the centralized processor, a recall of provided portions of the spectrum licensed to one of the first entities, the method being executed by at least one network-connected and cloud-based component;
   wherein at least one of a plurality of local broker engines estimating use of an exclusively-licensed spectrum controlled by the corresponding wireless network operator for a particular period of time;
   generating the request for available spectrum in a form of an offer such as a bid to lease available spectrum based on the estimating, the request including a time and a quantity of need for additional spectrum to supplement their exclusively-licensed spectrum; and
   communicating the request in the form of the bid to a global broker engine, the global broker engine executing the transaction via a scheme such as an auction resulting in the provision of the portions of the spectrum to a highest bidder;
   optimizing of the spectrum use among individual wireless devices being undertaken by at least one of the plurality of wireless network operators on a graduated scale according to management practices of the plurality of wireless network operators.

2. The method of claim 1, the first entities being one or more spectrum holders whose exclusively-licensed spectrum allocation is underused.

3. The method of claim 1, the centralized processor being the global broker engine comprised of multiple parallel processors for executing the method.

4. The method of claim 1, the second entities being the plurality of local broker engines that optimize spectrum use among individual wireless devices within the corresponding plurality of first coverage areas in the particular geographic location.

5. The method of claim 4, the centralized processor being a global broker engine that optimizes spectrum use across the plurality of local broker engines within a second coverage area that encompasses the plurality of first coverage areas in the particular region.

6. The method of claim 5, the plurality of local broker engines corresponding to a plurality of second entities including wireless network operators operating cells of coverage within the second coverage area.

7. The method of claim 1, the executing, by the centralized processor, of the recall of the provided portions of the spectrum comprising informing ones of the plurality of local broker engines using the recalled spectrum to cease using the recalled spectrum, the ones of the plurality of local broker engines using the recalled spectrum (1) ceasing to use the recalled spectrum within a specified amount of time, and (2) re-optimizing the spectrum use among the individual wireless devices according to available spectrum without the recalled spectrum.

8. The method of claim 7, the recall of provided portions of the spectrum being based licensed to one of the first entities on demand by the one of the first entities, (1) on the demand by the one of the first entities;
or (2) on an expiration of the prescribed period of time.

9. A system for locally implementing dynamic spectrum access, comprising: a monitoring device that monitors use of available spectrum by individual wireless devices in a particular geographic region;
   a spectrum estimator that generates estimates of (1) a time period in which a demand for use of available spectrum exceeds an amount of available spectrum in the particular geographic region;

and (2) an amount of additional spectrum appropriate to address the excess demand;

a processor that is programmed to generate a request for the amount of additional spectrum in the particular geographic region and over the requested time period, the request including an indication of at least one of a form of monetary compensation or other consideration offered to secure the amount of the additional spectrum; and direct communication of the request to a global broker that oversees available spectrum provided by primary spectrum holders and administers a transaction process to provide available spectrum to meet received requests;

a local spectrum optimizer that optimizes use of spectrum among the individual wireless devices including exclusively-licensed spectrum and any spectrum obtained from the global broker via the transaction process;

a data storage device that stores at least one of historical use data that is accessed by the spectrum estimator to facilitate generating the estimates;

a pre-determined bidding scheme that is accessed by the processor to generate the indication of at least one of the monetary compensation or the other consideration in the form of an offer or bid for the amount of additional spectrum; and information on the individual wireless devices that is accessed by at least one of the monitoring device to assist in the monitoring and the local spectrum optimizer to assist in the optimizing;

wherein the individual wireless devices being associated with a particular second entity operating at least one cell of coverage within the particular geographic region that includes an area of coverage of the global broker, the information on the wireless devices including a hierarchy of service levels that the local spectrum optimizer references to optimize the use of the individual wireless devices.

10. The system of claim 9, further comprising a communication interface for communicating with the global broker to forward the request for the additional spectrum to the global broker and to receive from the global broker at least (1) information on access to additional spectrum provided as a result of the transaction process, and (2) information on an on-demand recall of the provided spectrum when requested by a first entity holder of the provided spectrum.

11. The system of claim 10, the communicating with the global broker comprising a dynamic and interactive two-way exchange of information.

12. The system of claim 11, the hierarchy of service levels being based on agreements regarding level of service to be provided by the particular second entity to user of the individual wireless devices.

13. The system of claim 12, the local spectrum optimizer optimizing use of the spectrum among the individual wireless devices to avoid the spectrum obtained from the global broker via the transaction process when provided information by the global broker regarding the recall of the provided spectrum.

14. A global system for implementing dynamic spectrum access, comprising:

a first communication interface through which information is obtained from first entities on available spectrum in a particular geographic region, any conditions on the availability of the spectrum and any conditions related to an on-demand recall of the available spectrum;

a second communication interface through which requests are obtained for available spectrum in the particular geographic region from second entities, the requests including an indication of at least one of a form of monetary compensation or other consideration that the second entities offer to secure spectrum made available by the first entities;

a plurality of processors programmed to execute a transaction scheme to provide to individual ones of the second entities portions the spectrum made available by the first entities in the particular geographic location for a prescribed period of time;

inform the individual ones of the second entities of the provision of the portions of the spectrum for the prescribed period of time according to the executed transaction; and generate a request for the individual ones of the second entities for available spectrum in a form of an offer such as a bid to lease available spectrum based on an estimation, the request may include a time and a quantity of need for additional spectrum to supplement their exclusively-licensed spectrum; and communicate the request in the form of the bid to a global broker engine, the global broker engine executing the transaction via a scheme such as an auction resulting in the provision of the portions of the spectrum to a highest bidder;

execute at least one of an on-demand recall or a recall at an expiration of the prescribed period of time of the provided portions of the spectrum licensed to one of the first entities upon receipt of the information on the recall of the spectrum made available; and a global spectrum optimizer that optimizes use of spectrum among the second entities.

15. The system of claim 14, the first entities being one or more spectrum holders whose exclusively-licensed spectrum allocation is underused.

16. The system of claim 14, the second entities being a plurality of local broker engines that optimize spectrum use among individual wireless devices within a corresponding plurality of first coverage areas in the particular region.

17. The system of claim 16, the global spectrum optimizer optimizing use of spectrum among the second entities by optimizing spectrum use across the plurality of local broker engines within a second coverage area covered by the global spectrum optimizer that includes the plurality of first coverage areas in the particular region.

18. The system of claim 17, the plurality of local broker engines corresponding to a plurality of second entities including wireless network operators operating cells of coverage within the second coverage area.

19. The system of claim 18, the processor being further programmed to execute the recall of the provided spectrum by informing ones of the local broker engines using the recalled spectrum to cease using the recalled spectrum.

20. A non-transitory computer-readable medium storing computer-readable instructions which, when executed by a processor, causes the processor to execute a method for implementing dynamic spectrum access, the method comprising: obtaining information from first entities regarding available spectrum in a particular region, the first entities being one or more spectrum holders whose exclusively-licensed spectrum allocation is underused;

obtaining requests for available spectrum from second entities, including an indication of at least one of a form of monetary compensation or other consideration that the second entities will provide to secure spectrum made available by the first entities in the particular region, the second entities being a plurality of local broker engines that optimize spectrum use among individual wireless devices within a corresponding plurality of first coverage areas in the particular region;

executing a transaction scheme to provide to individual ones of the second entities portions the spectrum made available by the first entities in the particular geographic area for a prescribed period of time;

informing the individual ones of the second entities of the provision of the portions of the spectrum for the prescribed period of time according to the executed transaction; and executing at least one of an on-demand recall or a recall at an expiration of the prescribed period of time of provided portions of the spectrum licensed to one of the first entities, the method being executed by at least one network-connected and cloud-based component;

wherein the at least one of a plurality of local broker engines estimating use of an exclusively-licensed spectrum controlled by the corresponding wireless network operator for a particular period of time;

generating the request for available spectrum in a form of an offer such as a bid to lease available spectrum based on the estimating, the request including a time and a quantity of need for additional spectrum to supplement their exclusively-licensed spectrum; and communicating the request in the form of the bid to a global broker engine, the global broker engine executing the transaction via a scheme such as an auction resulting in the provision of the portions of the spectrum to a highest bidder;

optimizing by the plurality of local broker engines the spectrum use among individual wireless devices being undertaken by at least one of the plurality of wireless network operators on a graduated scale according to management practices of the plurality of wireless network operators.

* * * * *